United States Patent
Lainema et al.

(10) Patent No.: US 12,341,994 B2
(45) Date of Patent: Jun. 24, 2025

(54) APPARATUS, A METHOD AND A COMPUTER PROGRAM FOR VIDEO CODING AND DECODING

(71) Applicant: Nokia Technologies Oy, Espoo (FI)

(72) Inventors: Jani Lainema, Tampere (FI); Ramin Ghaznavi Youvalari, Tampere (FI)

(73) Assignee: Nokia Technologies Oy, Espoo (FI)

( * ) Notice: Subject to any disclaimer, the term of this patent is extended or adjusted under 35 U.S.C. 154(b) by 153 days.

(21) Appl. No.: 18/247,330

(22) PCT Filed: Sep. 29, 2021

(86) PCT No.: PCT/FI2021/050638
§ 371 (c)(1),
(2) Date: Mar. 30, 2023

(87) PCT Pub. No.: WO2022/074287
PCT Pub. Date: Apr. 14, 2022

(65) Prior Publication Data
US 2024/0007672 A1    Jan. 4, 2024

(30) Foreign Application Priority Data
Oct. 6, 2020    (FI) .................................... 20205974

(51) Int. Cl.
*H04N 19/61*    (2014.01)
*H04N 19/12*    (2014.01)
(Continued)

(52) U.S. Cl.
CPC ............ *H04N 19/61* (2014.11); *H04N 19/12* (2014.11); *H04N 19/124* (2014.11);
(Continued)

(58) Field of Classification Search
CPC ...... H04N 19/61; H04N 19/12; H04N 19/124; H04N 19/132; H04N 19/172; H04N 19/18; H04N 19/186
(Continued)

(56) References Cited

U.S. PATENT DOCUMENTS

2005/0147295 A1*  7/2005  Kim ...................... H04N 1/646
                                                 382/167
2010/0208989 A1*  8/2010  Narroschke .......... H04N 19/186
                                                 382/233

(Continued)

OTHER PUBLICATIONS

"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.

(Continued)

*Primary Examiner* — Matthew David Kim
(74) *Attorney, Agent, or Firm* — Joseph C. Drish; Carter & English, LLP

(57) ABSTRACT

A method comprising: determining a first sample in an input color space (500); determining a component of the input color space that the first sample represents (502); determining a pre-quantizer based on the determined component (504); quantizing the first sample using the determined pre-quantizer (506); and encoding the first sample value with video or image coding means (508).

20 Claims, 6 Drawing Sheets

(51) Int. Cl.
　　　H04N 19/124　(2014.01)
　　　H04N 19/132　(2014.01)
　　　H04N 19/172　(2014.01)
　　　H04N 19/18　(2014.01)
　　　H04N 19/186　(2014.01)
(52) U.S. Cl.
　　　CPC ......... *H04N 19/132* (2014.11); *H04N 19/172* (2014.11); *H04N 19/18* (2014.11); *H04N 19/186* (2014.11)
(58) Field of Classification Search
　　　USPC .................................................... 375/240.03
　　　See application file for complete search history.

(56) References Cited

U.S. PATENT DOCUMENTS

| | | | | |
|---|---|---|---|---|
| 2016/0080712 | A1* | 3/2016 | Daly | G09G 3/2003 345/597 |
| 2016/0180761 | A1* | 6/2016 | Sasaki | G09G 3/36 345/88 |
| 2016/0269733 | A1* | 9/2016 | Tourapis | H04N 19/186 |
| 2017/0085879 | A1* | 3/2017 | Minoo | H04N 19/174 |
| 2017/0105014 | A1* | 4/2017 | Lee | H04N 19/85 |
| 2018/0276499 | A1* | 9/2018 | Bak | G06V 20/52 |
| 2018/0376047 | A1* | 12/2018 | Li | H04N 19/186 |
| 2019/0139203 | A1* | 5/2019 | Yokota | G06T 5/90 |
| 2019/0297320 | A1* | 9/2019 | Yamamoto | H04N 19/14 |
| 2020/0068181 | A1* | 2/2020 | Sun | H04N 9/646 |
| 2020/0242739 | A1* | 7/2020 | Laine | G06N 7/01 |
| 2021/0203941 | A1* | 7/2021 | Huo | H04N 19/176 |
| 2022/0070476 | A1* | 3/2022 | Wan | H04N 19/176 |
| 2022/0217348 | A1* | 7/2022 | Iwamura | H04N 19/186 |

OTHER PUBLICATIONS

"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.

"High Efficiency Video Coding", Series H: Audiovisual And Multimedia Systems, Infrastructure of audiovisual services—Coding of moving video, Recommendation ITU-T H.265, Feb. 2018, 692 pages.

"Coding-independent code points for video signal type identification", Series H: Audiovisual And Multimedia Systems, Infrastructure of audiovisual services—Coding of moving video, Recommendation ITU-T H.273, Dec. 2016, 30 pages.

Han et al., "Comparison between Different Color Transformations for the JPEG 2000", IS&T's 2000 PICS Conference, 2000, 5 pages.

"Versatile Video Coding", Series H: Audiovisual and Multimedia Systems Infrastructure of audiovisual services—Coding of moving video, Recommendation ITU-T H.266, Aug. 2020, 516 pages.

"IEEE 802.11", Wikipedia, Retrieved on Feb. 26, 2024, Webpage available at : https://en.wikipedia.org/wiki/IEEE_802.11.

"Information Technology—Generic Coding of Moving Pictures and Associated Audio Information: Systems", Series H: Audiovisual and Multimedia Systems, Infrastructure of Audiovisual Services—Transmission Multiplexing and Synchronization, Recommendation ITU-T H.222.0, Mar. 2017, 291 pages.

"Information Technology—Coding Of Audio-Visual Objects—Part 12: ISO Base Media File Format", ISO/IEC 14496-12, Fifth edition, Dec. 15, 2015, 248 pages.

"Information Technology—Coding Of Audio-Visual Objects—Part 15: Advanced Video Coding (AVC) File Format", ISO/IEC 14496-15, First edition, Apr. 15, 2004, 29 pages.

"Parameter Values for Ultra-High Definition Television Systems for Production And International Programme Exchange", Recommendation ITU-R BT.2020, Aug. 2012, 7 pages.

"Parameter Values for the HDTV Standards for Production and International Programme Exchange", Recommendation ITU-R BT.709-6, Jun. 2015, 19 pages.

Office Action received for corresponding Finnish Patent Application No. 20205974, dated Jun. 8, 2021, 10 pages.

Wang et al., "Colour space transforms for improved video compression", IWSSIP 2014 Proceedings, May 12-15, 2014, pp. 219-222.

Vipul H et al., "A comprehensive investigation of color models used in image processing", International Journal of Computer Applications, vol. 180, No. 22, Feb. 2018, pp. 19-24.

International Search Report and Written Opinion received for corresponding Patent Cooperation Treaty Application No. PCT/FI2021/050638, dated Jan. 13, 2022, 17 pages.

Yeo et al., "Mode-Dependent Fast Separable KLT for Block-based Intra Coding", Institute for Infocomm Research, Joint Collaborative Team on Video Coding (JCT-VC) of ITU-T SG16 WP3 and ISO/IEC JTC1/SC29/WG11, JCTVC-B024, 2nd Meeting, Jul. 21-28, 2010, 7 pages.

* cited by examiner

APPARATUS, A METHOD AND A COMPUTER PROGRAM FOR VIDEO CODING AND DECODING

RELATED APPLICATION

This application was originally filed as PCT Application No. PCT/FI2021/050638, filed on Sep. 29, 2021, which claims priority from Finland Application No. 20205974, filed on Oct. 6, 2020, each of which is incorporated herein by reference in its entirety.

TECHNICAL FIELD

The present invention relates to an apparatus, a method and a computer program for video coding and decoding.

BACKGROUND

Video and image samples are typically encoded using color representations such as YUV or YCbCr consisting of one luminance and two chrominance channels. YUV or YCbCr color space is found to reflect some characteristics of human visual system and allows using lower quality representation for Cb and Cr channels as human perception is less sensitive to the chrominance fidelity those channels represent.

While a video is typically captured and rendered in RGB (Red, Green, Blue) color space, it is typically transferred into a YUV or YCbCr color space for enabling more efficient encoding. The transform between these color spaces may be carried out as a 3×3 matrix multiplication where the coefficients are fixed based on the type of YUV that is selected to be used for a certain application. Matrix coefficients are selected taking into account some human visual system characteristics and also some technical characteristics of the processing pipeline. However, using a YUV color space may not be optimal in many scenarios, especially when representing content with rich colors that has RGB values spreading across the whole input color space.

SUMMARY

Now in order to at least alleviate the above problems, enhanced methods for a color space transformation and an inverse color space transformation are introduced herein. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

A method according to a first aspect comprises determining a first sample in an input color space; determining a component of the input color space that the first sample represents; determining a pre-quantizer based on the determined component; quantizing the first sample using the determined pre-quantizer; and encoding the first sample value with video or image coding means.

An apparatus according to a second embodiment comprises: means for determining a first sample in an input color space; means for determining a component of the input color space that the first sample represents; means for determining a pre-quantizer based on the determined component; means for quantizing the first sample using the determined pre-quantizer; and means for encoding the first sample value with video or image coding means.

According to an embodiment, the apparatus comprises means for performing a color space transform with a matrix multiplication, wherein a forward transform matrix comprises matrix coefficients defining a transform that confines all the color channels within a dynamic range of the input.

According to an embodiment, the apparatus comprises means for calculating coefficients for forward and inverse color transforms based on content characteristics of at least the first sample; and means for indicating at least one of the forward and the inverse coefficients to the decoder.

According to an embodiment, the apparatus comprises means for calculating a color space conversion matrix based on Karhunen-Loeve transform using a covariance matrix calculated using red, green and blue sample values of a picture, multiple pictures or a subset of a picture.

According to an embodiment, said covariance matrix is calculated using predicted values of red, green and blue samples.

According to an embodiment, said covariance matrix is calculated using prediction difference values of red, green and blue samples.

A method according to a third aspect comprises decoding at least a first sample value with video or image decoding means; performing a color space transform operation including mapping of the first sample value in a first color space to a second sample value in a second color space; selecting a post-quantizer for the second sample value based on which output color space component the second sample represents; and dequantizing the second sample value with the selected post-quantizer.

An apparatus according to a fourth aspect comprises means for decoding at least a first sample value with video or image decoding means; means for performing a color space transform operation including mapping of the first sample value in a first color space to a second sample value in a second color space; means for selecting a post-quantizer for the second sample value based on which output color space component the second sample represents; and means for dequantizing the second sample value with the selected post-quantizer.

According to an embodiment, the apparatus comprises means for performing an inverse color space transform with a matrix multiplication, wherein an inverse of an inverse transform matrix comprises matrix coefficients defining a transform that confines all the color channels within a dynamic range of the input.

According to an embodiment, the apparatus comprises means for decoding an indication of scaling parameters for red, green and blue color components; and means for scaling the red, green and blue color components based on the scaling parameters.

According to an embodiment, the apparatus comprises means for performing a color transform using a first matrix of coefficients, wherein the matrix of coefficients is constructed such that scaling the columns of the first matrix with first coefficients, transposing the scaled matrix and scaling the rows of the resulting transposed matrix with inverses of the first coefficients represents an inverse of the first matrix.

According to an embodiment, the apparatus comprises means for performing a color transform using a first matrix of coefficients, wherein the matrix of coefficients is constructed such that scaling the columns of the first matrix with first coefficients, and rows with second coefficients, transposing the scaled matrix and scaling the rows of the resulting transposed matrix with inverses of the first coefficients, and scaling the columns with inverses of the second coefficients represents an inverse of the first matrix.

According to an embodiment, the apparatus comprises means for calculating a color space conversion matrix based on Karhunen-Loeve transform using a covariance matrix calculated using red, green and blue sample values of a picture, multiple pictures or a subset of a picture.

According to an embodiment, said covariance matrix is calculated using prediction difference values of red, green and blue samples.

The apparatuses and the computer readable storage mediums stored with code thereon, as described above, are thus arranged to carry out the above methods and one or more of the embodiments related thereto.

BRIEF DESCRIPTION OF THE DRAWINGS

For better understanding of the present invention, reference will now be made by way of example to the accompanying drawings in which.

DETAILED DESCRIPTION OF SOME EXAMPLE EMBODIMENTS

Figure 1:
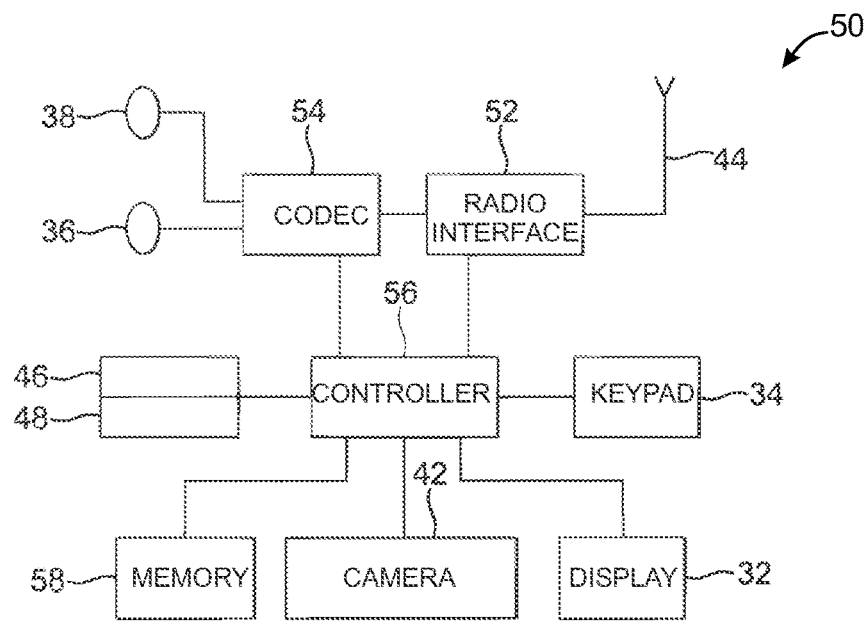
FIG. 1 shows schematically an electronic device employing embodiments of the invention.
Figure 2:
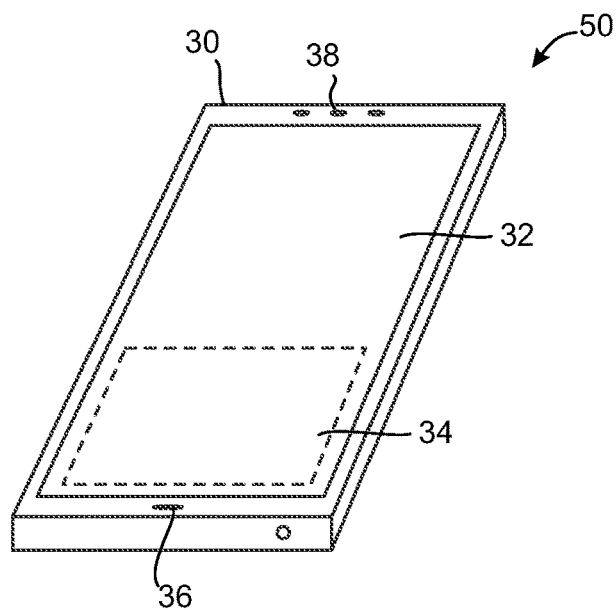
FIG. 2 shows schematically a user equipment suitable for employing embodiments of the invention.

The following describes in further detail suitable apparatus and possible mechanisms for performing for a color space transformation. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
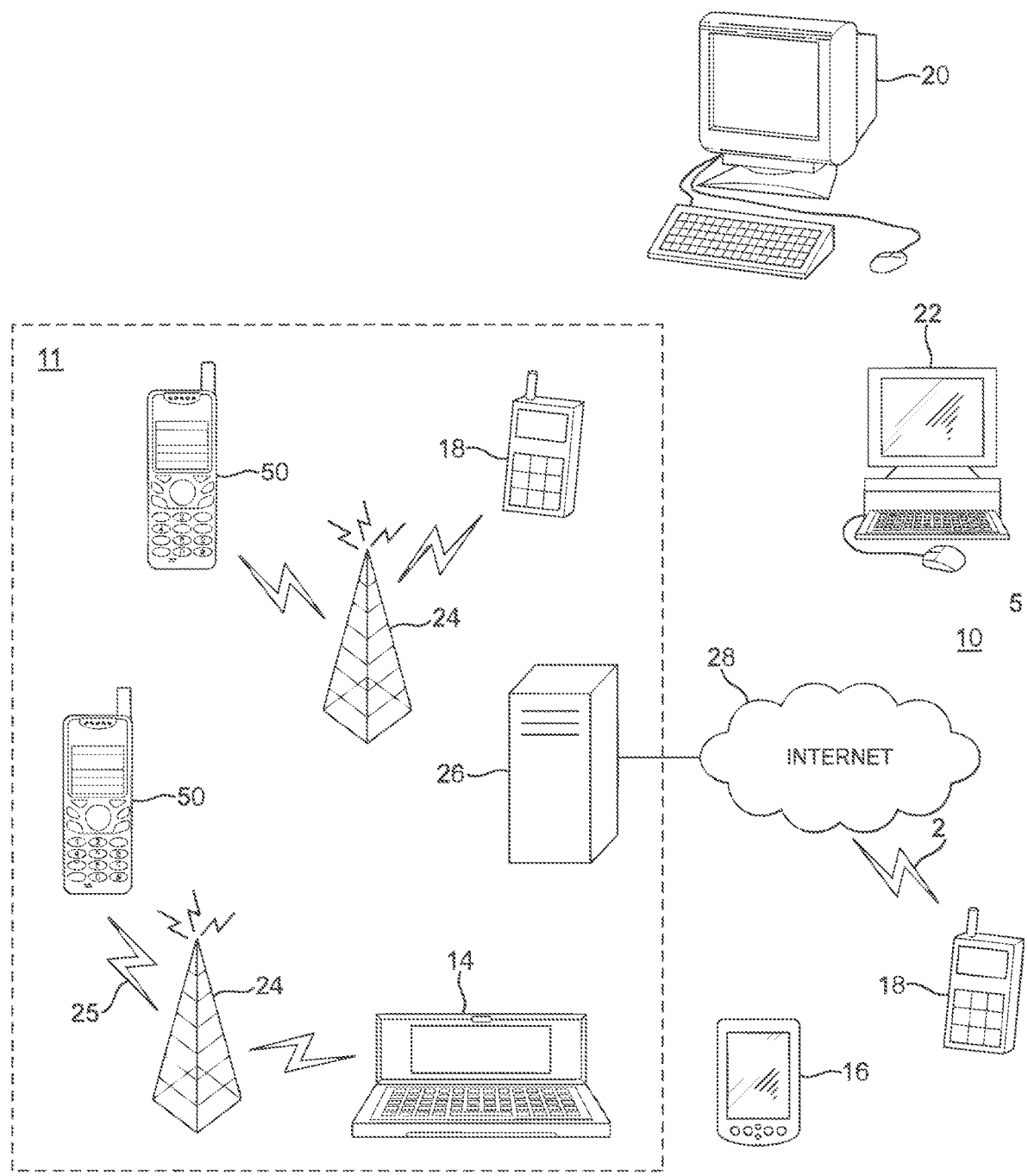
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Motion compensation can be performed either with full sample or sub-sample accuracy. In the case of full sample accurate motion compensation, motion can be represented as a motion vector with integer values for horizontal and vertical displacement and the motion compensation process effectively copies samples from the reference picture using those displacements. In the case of sub-sample accurate motion compensation, motion vectors are represented by fractional or decimal values for the horizontal and vertical components of the motion vector. In the case a motion vector is referring to a non-integer position in the reference picture, a sub-sample interpolation process is typically invoked to calculate predicted sample values based on the reference samples and the selected sub-sample position. The sub-sample interpolation process typically consists of horizontal filtering compensating for horizontal offsets with respect to full sample positions followed by vertical filtering compensating for vertical offsets with respect to full sample positions. However, the vertical processing can be also be done before horizontal processing in some environments.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4A:
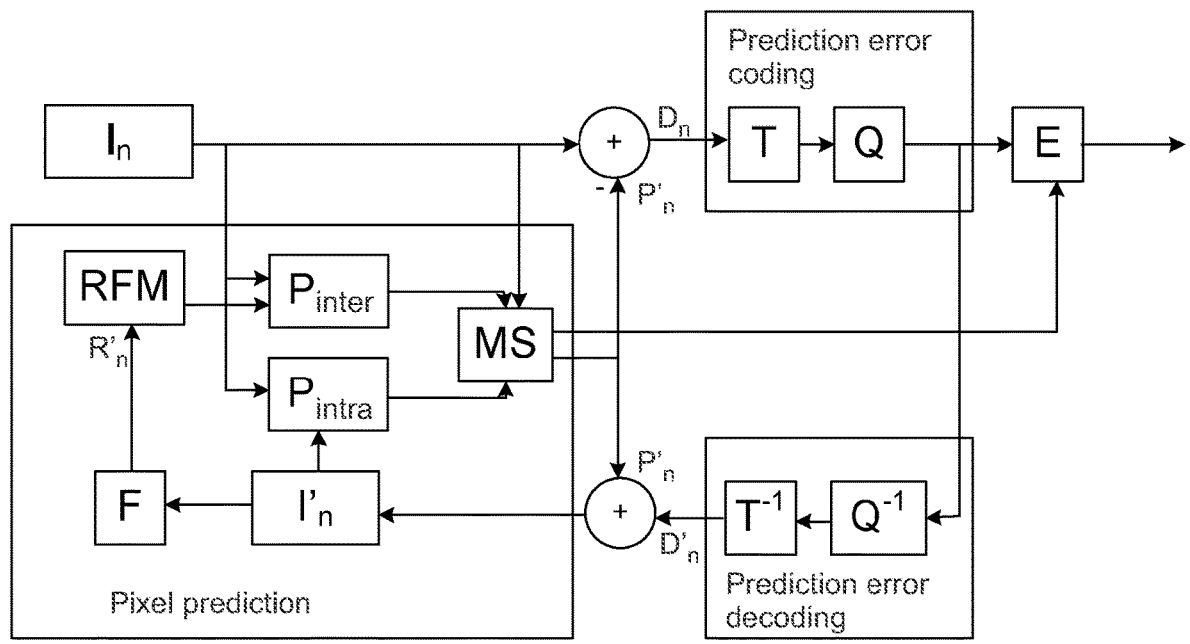
FIGS. 4a and 4b show schematically an encoder and a decoder suitable for implementing embodiments of the invention.
Figure 4B:
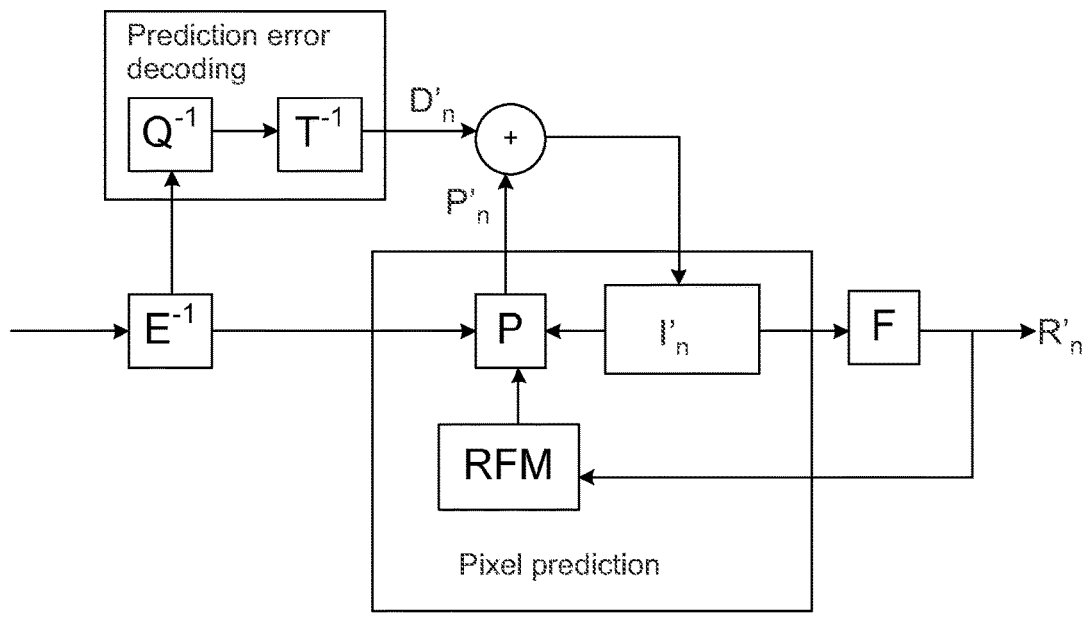

FIGS. 4a and 4b show an encoder and a decoder suitable for employing embodiments of the invention. A video codec consists of an encoder that transforms an input video into a compressed representation suited for storage/transmission and a decoder that can decompress the compressed video representation back into a viewable form. Typically, the encoder discards and/or loses some information in the original video sequence in order to represent the video in a more compact form (that is, at lower bitrate). An example of an encoding process is illustrated in FIG. 4a. FIG. 4a illustrates an image to be encoded (I$_n$); a predicted representation of an image block (P'$_n$); a prediction error signal (D$_n$); a reconstructed prediction error signal (D'$_n$); a preliminary reconstructed image (I'$_n$); a final reconstructed image (R'$_n$); a transform (T) and inverse transform (T$^{-1}$); a quantization (Q) and inverse quantization (Q$^{-1}$); entropy encoding (E); a reference frame memory (RFM); inter prediction (P$_{inter}$); intra prediction (P$_{intra}$); mode selection (MS) and filtering (F).

An example of a decoding process is illustrated in FIG. 4b. FIG. 4b illustrates a predicted representation of an image block (P'$_n$); a reconstructed prediction error signal (D'$_n$); a preliminary reconstructed image (I'$_n$); a final reconstructed image (R'$_n$); an inverse transform (T$^{-1}$); an inverse quantization (Q$^{-1}$); an entropy decoding (E$^{-1}$); a reference frame memory (RFM); a prediction (either inter or intra) (P); and filtering (F).

Many hybrid video encoders encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate). Video codecs may also provide a transform skip mode, which the encoders may choose to use. In the transform skip mode, the prediction error is coded in a sample domain, for example by deriving a sample-wise difference value relative to certain adjacent samples and coding the sample-wise difference value with an entropy coder.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

The phrase along the bitstream (e.g. indicating along the bitstream) may be defined to refer to out-of-band transmission, signalling, or storage in a manner that the out-of-band data is associated with the bitstream. The phrase decoding along the bitstream or alike may refer to decoding the referred out-of-band data (which may be obtained from out-of-band transmission, signalling, or storage) that is associated with the bitstream. For example, an indication along the bitstream may refer to metadata in a container file that encapsulates the bitstream.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).)

Version 1 of the High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range, threedimensional, and screen content coding extensions which may be abbreviated SHVC, MV-HEVC, REXT, 3D-HEVC, and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

Versatile Video Coding (VVC) (MPEG-I Part 3), a.k.a. ITU-T H.266, is a video compression standard being developed by the Joint Video Experts Team (JVET) of the Moving Picture Experts Group (MPEG), (formally ISO/IEC JTC1 SC29 WG11) and Video Coding Experts Group (VCEG) of the International Telecommunication Union (ITU) to be the successor to HEVC/H.265.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. A picture given as an input to an encoder may also be referred to as a source picture, and a picture decoded by a decoded may be referred to as a decoded picture.

The source and decoded pictures are each comprised of one or more sample arrays, such as one of the following sets of sample arrays:
 Luma (Y) only (monochrome).
 Luma and two chroma (YCbCr or YCgCo).
 Green, Blue and Red (GBR, also known as RGB).
 Arrays representing other unspecified monochrome or tri-stimulus color samplings (for example, YZX, also known as XYZ).

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:
 In monochrome sampling there is only one sample array, which may be nominally considered the luma array.
 In 4:2:0 sampling, each of the two chroma arrays has half the height and half the width of the luma array.
 In 4:2:2 sampling, each of the two chroma arrays has the same height and half the width of the luma array.
 In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired coding mode for a block and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C = D + \lambda R, \quad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring CU may be regarded as unavailable for intra prediction, if the neighboring CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming.

Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream, consisting of VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units are typically coded slice NAL units. In HEVC, VCL NAL units contain syntax elements representing one or more CU.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) or along a coded unit of a bitstream (e.g. indicating along a coded tile) may be used in claims and described embodiments to refer to out-of-band transmission, signaling, or storage in a manner that the out-of-band data is associated with the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively.

A SEI NAL unit may contain one or more SEI messages, which are not required for the decoding of output pictures but may assist in related processes, such as picture output timing, rendering, error detection, error concealment, and resource reservation.

A coded picture is a coded representation of a picture. In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be defined as an access unit in which the base layer picture is an IRAP picture. The value of NoRaslOutputFlag is equal to 1 for each IDR picture, each BLA picture, and each IRAP picture that is the first picture in that particular layer in the bitstream in decoding order, is the first IRAP picture that follows an end of sequence NAL unit having the same value of nuh_layer_id in decoding order. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Motion parameter types or motion information may include but are not limited to one or more of the following types:
 an indication of a prediction type (e.g. intra prediction, uni-prediction, bi-prediction) and/or a number of reference pictures;
 an indication of a prediction direction, such as inter (a.k.a. temporal) prediction, inter-layer prediction, inter-view prediction, view synthesis prediction (VSP), and inter-component prediction (which may be indicated per reference picture and/or per prediction type and where in some embodiments inter-view and view-synthesis prediction may be jointly considered as one prediction direction) and/or
 an indication of a reference picture type, such as a short-term reference picture and/or a long-term reference picture and/or an inter-layer reference picture (which may be indicated e.g. per reference picture)
 a reference index to a reference picture list and/or any other identifier of a reference picture (which may be indicated e.g. per reference picture and the type of which may depend on the prediction direction and/or the reference picture type and which may be accompanied by other relevant pieces of information, such as the reference picture list or alike to which reference index applies);

a horizontal motion vector component (which may be indicated e.g. per prediction block or per reference index or alike);

a vertical motion vector component (which may be indicated e.g. per prediction block or per reference index or alike);

one or more parameters, such as picture order count difference and/or a relative camera separation between the picture containing or associated with the motion parameters and its reference picture, which may be used for scaling of the horizontal motion vector component and/or the vertical motion vector component in one or more motion vector prediction processes (where said one or more parameters may be indicated e.g. per each reference picture or each reference index or alike);

coordinates of a block to which the motion parameters and/or motion information applies, e.g. coordinates of the top-left sample of the block in luma sample units;

extents (e.g. a width and a height) of a block to which the motion parameters and/or motion information applies.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

Bit-depth scalability: Base layer pictures are coded at lower bit-depth (e.g. 8 bits) than enhancement layer pictures (e.g. 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

View scalability, which may also be referred to as multiview coding. The base layer represents a first view, whereas an enhancement layer represents a second view. A view may be defined as a sequence of pictures representing one camera or viewpoint. It may be considered that in stereoscopic or two-view video, one video sequence or view is presented for the left eye while a parallel view is presented for the right eye.

Depth scalability, which may also be referred to as depth-enhanced coding. A layer or some layers of a bitstream may represent texture view(s), while other layer or layers may represent depth view(s).

Region-of-interest scalability (as described below).

Interlaced-to-progressive scalability (also known as field-to-frame scalability): coded interlaced source content material of the base layer is enhanced with an enhancement layer to represent progressive source content. The coded interlaced source content in the base layer may comprise coded fields, coded frames representing field pairs, or a mixture of them. In the interlace-to-progressive scalability, the base-layer picture may be resampled so that it becomes a suitable reference picture for one or more enhancement-layer pictures.

Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures. For example, the base layer may be coded with H.264/AVC and an enhancement layer may be coded with an HEVC multi-layer extension.

It should be understood that many of the scalability types may be combined and applied together. For example color gamut scalability and bit-depth scalability may be combined.

The term layer may be used in context of any type of scalability, including view scalability and depth enhancements. An enhancement layer may refer to any type of an enhancement, such as SNR, spatial, multiview, depth, bit-depth, chroma format, and/or color gamut enhancement. A base layer may refer to any type of a base video sequence, such as a base view, a base layer for SNR/spatial scalability, or a texture base view for depth-enhanced video coding.

As described above, video and image samples are typically encoded using color representations, such as YUV or YCbCr consisting of one luminance and two chrominance channels. YUV or YCbCr color space is found to reflect some characteristics of human visual system and allows using lower quality representation for Cb and Cr channels as human perception is less sensitive to the chrominance fidelity those channels represent.

While a video is typically captured and rendered in RGB (Red, Green, Blue) color space, it is typically transferred into a YUV or YCbCr color space for enabling more efficient encoding. The transform between these color spaces is a 3×3 matrix multiplication where the coefficients are fixed based on the type of YUV that is selected to be used for a certain application. Matrix coefficients are selected taking into account some human visual system characteristics and also some technical characteristics of the processing pipeline. However, using a YUV color space may not be optimal in many scenarios, especially when representing content with rich colors that has RGB values spreading across the whole input color space.

Now improved methods for a color space transformation and an inverse color space transformation process are introduced.

Figure 5:
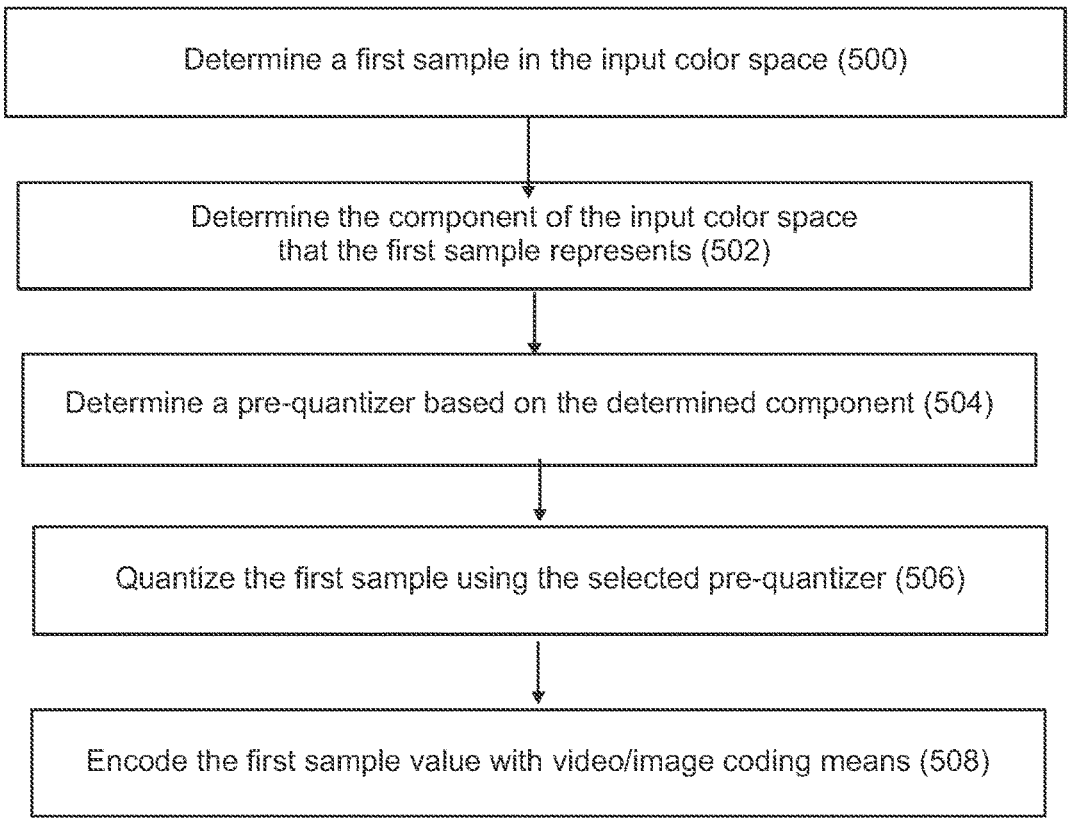
FIG. 5 shows a flow chart of an encoding method according to an embodiment of the invention.

A method according to an aspect is shown in FIG. 5, where an encoding method comprises determining (500) a first sample in an input color space; determining (502) a component of the input color space that the first sample represents; determining (504) a pre-quantizer based on the determined component; quantizing (506) the first sample using the determined pre-quantizer; and encoding (508) the first sample value with video or image coding means.

Figure 6:
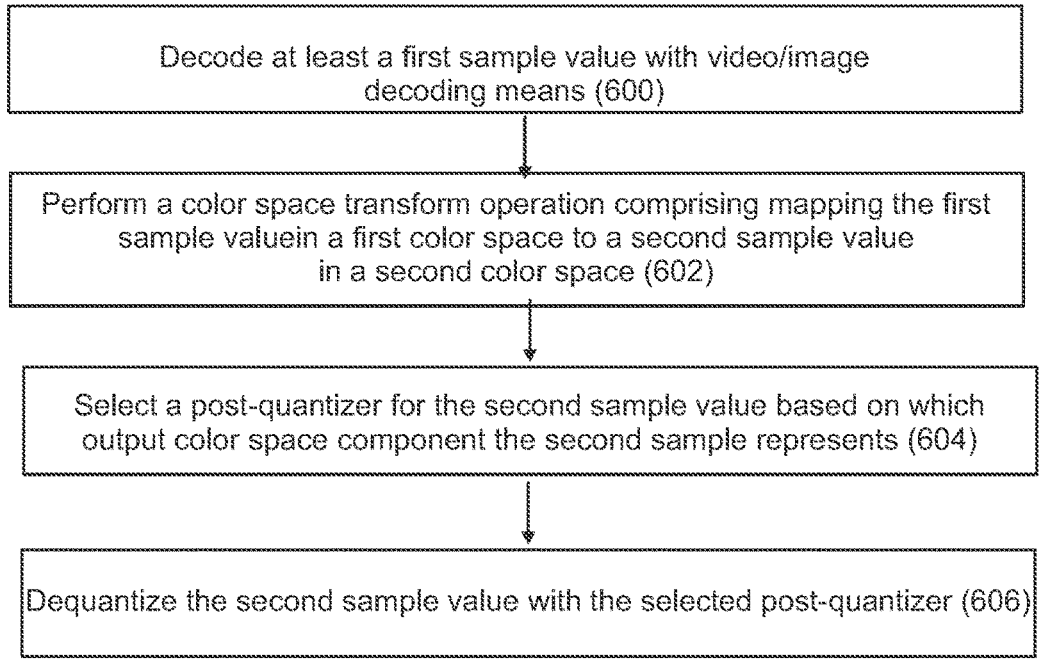
FIG. 6 shows a flow chart of a decoding method according to an embodiment of the invention.

A method according to another aspect is shown in FIG. 6, where a decoding method comprises decoding (600) at least a first sample value with video or image decoding means; performing (602) a color space transform operation including mapping of the first sample value in a first color space to a second sample value in a second color space; selecting (604) a post-quantizer for the second sample value based on which output color space component the second sample represents; and dequantizing (606) the second sample value with the selected post-quantizer.

Figure 7:
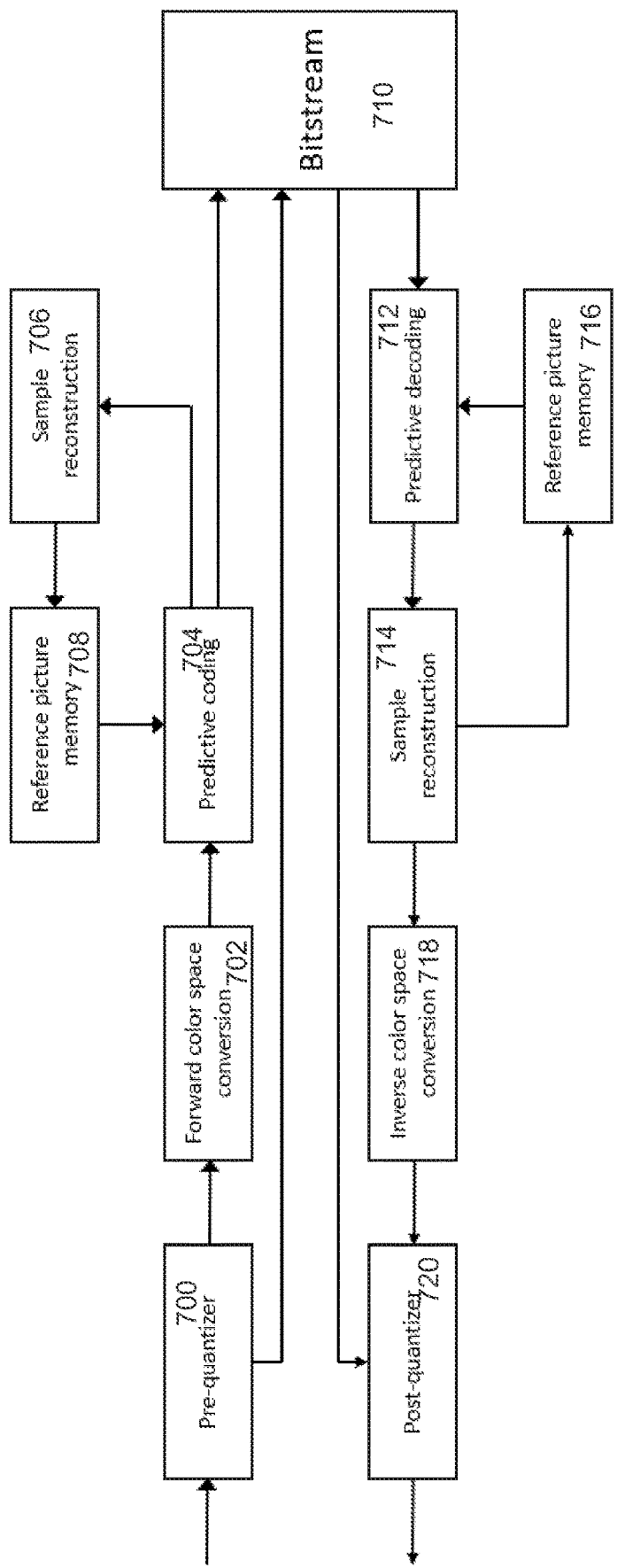
FIG. 7 shows a block chart illustrating the operation of an encoder an a decoder according to an embodiment of the invention.

FIG. 7 illustrates the operation according to an example embodiment. In this example a pre-quantizer 700 is operated before the forward color transform operation 702 and the pre-quantization information is included in the video bitstream 710. After the forward color transform a predictive video or image coding loop 704 is entered where sample reconstruction process 706 generates reference pictures or samples and stores those in the reference picture memory 708 for potential use for prediction of future samples. In this example, the decoder consists of corresponding predictive decoding loop 712 where sample reconstruction process 714 generates reconstructed samples, which are stored for future referencing in the reference pictures memory 716. Reconstructed samples are further input to the inverse color space conversion 718 and the post-quantizer operation 720 that dequantizes the color converted samples using control signals read from the bitstream 710.

According to an embodiment, a color space transform or inverse color space transform is representable with a matrix multiplication and a forward transform or an inverse of an inverse transform matrix comprises matrix coefficients defining a transform that confines all the color channels within a dynamic range of the input.

Thus, a video encoder or decoder may perform a color space transform or an inverse color space transform, correspondingly, where the transform or the inverse transform is representable with a matrix multiplication and the forward transform or the inverse of the inverse transform matrix, correspondingly, may consists of matrix coefficients defining a transform that confines all the color channels within the dynamic range of the input.

In general, a forward color space transform can be given as a set of equations:

$$s0 = f00*sR + f01*sG + f02*sB$$

$$s1 = f10*sR + f11*sG + f12*sB$$

$$s2 = f20*sR + f21*sG + f22*sB$$

or in the matrix form:

$$\begin{bmatrix} s0 \\ s1 \\ s2 \end{bmatrix} = F \begin{bmatrix} sR \\ sG \\ sB \end{bmatrix} = \begin{bmatrix} f00 & f01 & f02 \\ f10 & f11 & f12 \\ f20 & f21 & f22 \end{bmatrix} \begin{bmatrix} sR \\ sG \\ sB \end{bmatrix}$$

where input sample values sR, sG and sB represent a pixel in the first color space, matrix coefficients fyx determine the color space conversion operation as a matrix multiplication and output sample values s0, s1 and s2 represent a pixel in the second color space. Typically, this kind of a forward color transform is applied to the image data before encoding it and the output sample values s0, s1 and s2 thus represent the input to a video or image encoder.

Similarly, the inverse transformation process can be described using an inverse transform matrix G (or $F^{-1}$):

$$\begin{bmatrix} sR \\ sG \\ sB \end{bmatrix} = G \begin{bmatrix} s0 \\ s1 \\ s2 \end{bmatrix} = \begin{bmatrix} g00 & g01 & g02 \\ g10 & g11 & g12 \\ g20 & g21 & g22 \end{bmatrix} \begin{bmatrix} s0 \\ s1 \\ s2 \end{bmatrix}$$

or as a set of equations:

$$sR = g00*s0 + g01*s1 + g02*s2$$

$$sG = g10*s0 + g11*s1 + g12*s2$$

$$sB = g20*s0 + g21*s1 + g22*s2$$

In this notation the input sample values s0, s1 and s2 represent a pixel in the second color space, matrix coefficients gyx determine the inverse color space conversion operation as a matrix multiplication and output sample values sR, sG and sB represent a pixel in the first color space. Typically, this kind of an inverse color transform is applied to the image data after decoding it and the sample values s0, s1 and s2 thus represent output of a video or image decoder and the resulting sample values sR, sG and sB are typically sample values in RGB color space intended for rendering on a display device.)

In the ideal case the forward transform matrix F and the inverse transform matrix G form an identity operation:

$$GF = I = \begin{bmatrix} 1 & 0 & 0 \\ 0 & 1 & 0 \\ 0 & 0 & 1 \end{bmatrix}$$

However, in practice that may not be the case as the operation is often using integer arithmetic and the resulting sample values are typically rounded to integer values to represent sample values at a selected accuracy depending on the bitdepth of the video content, such as 8 bit, 10 bit or 12 bit accuracy. Also, after a typical forward transform offsets are added to at least some of the output components to make those non-negative and clipping is applied to force any sample value to the value range allowed by the selected bitdepth of the samples.

An encoder may use different approaches to determine the coefficients in the forward and inverse color transform matrices. Typically, the coefficients are determined by the application or application standard. For example, in different television standards a different set of coefficients are agreed to be used for forward and inverse transforms.

According to an embodiment, the method further comprises calculating, by the video encoder, the coefficients for forward and inverse color transforms based on content characteristics and indicating at least one of the forward and the inverse coefficients to the decoder.

In the following, various embodiments are described using Karhunen-Loeve transform (KLT) as an example of a decorrelating color space transform. It is, however, noted that KLT is only one example of such a transform, and the embodiments can be applied identically for any linear transform and some non-linear transforms.

Accordingly, the color transform can be generated using the Karhunen-Loeve transform (KLT) or other decorrelating transform as the basis. The resulting matrix coefficients from such content adaptive transforms are advantageously scaled so that:

$$0 \leq f00 + f01 + f02 \leq 1$$

$$-0.5 \leq f10 + f11 + f12 \leq 0.5$$

$$-0.5 \leq f20 + f21 + f22 \leq 0.5$$

The scaling is done in order to represent the samples s0 of the first color component with positive values between zero and one. Similarly, the remaining two color components typically representing differential color components s1 and s2 are scaled to have values between −0.5 and 0.5. Also, an offset corresponding to 0.5 is typically added to s1 and s2 to move the range to positive [0, 1] and the values are further represented in integer domain at a given bitdepth. For example, in the case of bitdepth of 10 bits allowing representing non-negative integers from 0 to 1023, the equations may be rewritten as:

$$0 \leq f00 + f01 + f02 \leq 1023$$

$$-512 \leq f10 + f11 + f12 \leq 511$$

$$-512 \leq f20 + f21 + f22 \leq 511$$

or:

$$0 \leq f00 + f01 + f02 \leq 1023$$

$$0 \leq f10 + f11 + f12 + 512 \leq 1023$$

$$0 \leq f20 + f21 + f22 + 512 \leq 1023$$

According to an embodiment, the video or image decoder, or a rendering device, performs a color transform using a first matrix of coefficients where the matrix of coefficients is constructed so that the scaling the columns of the first matrix with coefficients c0, c1 and c2, transposing the result and scaling the rows of the resulting transposed matrix with inverses of c0, c1 and c2 represents an inverse of the first matrix.

Thus, the scaling can be advantageously performed by dividing the row x of the forward transform matrix and multiplying the column x of the inverse transform matrix with scaling coefficient cx. In the case of an orthogonal transforms (such as KLT) the inverse of the matrix multiplication is represented as the transpose of the forward transform matrix. For example, the forward and inverse KLT matrices Fklt and Gklt can be written as:

$$F_{klt} = \begin{bmatrix} k00 & k01 & k02 \\ k10 & k11 & k12 \\ k20 & k21 & k22 \end{bmatrix}$$

$$G_{klt} = \begin{bmatrix} k00 & k10 & k20 \\ k01 & k11 & k21 \\ k02 & k12 & k22 \end{bmatrix}$$

The scaled forward and inverse matrices can be derived by dividing rows and multiplying columns with the scaling factors cx as follows:

$$F = \begin{bmatrix} k00/c0 & k01/c0 & k02/c0 \\ k10/c1 & k11/c1 & k12/c1 \\ k20/c2 & k21/c2 & k22/c2 \end{bmatrix}$$

$$G = \begin{bmatrix} k00 \cdot c0 & k10 \cdot c1 & k20 \cdot c2 \\ k01 \cdot c0 & k11 \cdot c1 & k21 \cdot c2 \\ k02 \cdot c0 & k12 \cdot c1 & k22 \cdot c2 \end{bmatrix}$$

In order to calculate scaling factors for a color transform matrix the sum of positive and sum of negative values in rows of forward transform or columns of inverse color transform are advantageously used. Using the elements k of either forward color transform Fklt or inverse color transform Gklt the scaling factors c can be calculated for example using the following pseudo code, where c[y] refers to c0, c1 and c2; and k[y][x] refers to kyx:

```
sumPos[3] = { 0.0, 0.0, 0.0 }
sumNeg[3] = { 0.0, 0.0, 0.0 }
for y = 0, 1, 2 {
   for x = 0, 1, 2 {
      if k[y][x] >= 0.0
         sumPos[y] += k[y][x]
      else
         sumNeg[y] -= k[y][x]
   }
}
for y = 0, 1, 2 {
   scale = sumPos[y] > sumNeg[y] ? sumPos[y] : sumNeg[y]
   if y == 0
      c[y] = scale
   else
      c[y] = 2 * scale
}
```

It should be noted that in this example c0 is assigned the larger one of sum of positive or negative transform elements in a row or column of the transform matrices, while c1 and c2 are assign with double the value. This is applicable in the case the first forward transformed color component s0 represents a weighted sum of the input color components sR, sG and sB, while the other forward transformed color components represent differential colors. In some special cases the calculation can be extended to include checks if that is a valid assumption with the selected transform coefficients. This can be done for example by rewriting the second part of the pseudo code as:

```
for y = 0, 1, 2 {
    scale = sumPos[y] > sumNeg[y] ? sumPos[y] : sumNeg[y]
    if sumPos[y] > 0 and sumNeg[y] > 0
        c[y] = 2 * scale
    else
        c[y] = scale
}
```

According to an embodiment, the method comprises calculating, by the video or image encoder or decoder, a color space conversion matrix based on Karhunen-Loeve transform using a covariance matrix calculated using red, green and blue sample values of a picture, multiple pictures or a subset of a picture.

In order to calculate the KLT matrix coefficients or matrix coefficients using other optimization techniques, different approaches can be used. For example, a covariance matrix of an input data set may be generated and the eigenvectors defining the KLT transform may be calculated with a selected numerical approach. Calculating the covariance matrix can be done in different ways. For example, the following pseudo code illustrates a straight-forward calculation of a covariance matrix coefficients v[y][x]:

```
for y = 0 to height - 1 {
    for x = 0 to width - 1 {
        r = sR[y][x]
        g = sG[y][x]
        b = sB[y][x]
        v[0][0] += r*r
        v[0][1] += r*g
        v[0][2] += r*b
        v[1][0] += g*r
        v[1][1] += g*g
        v[1][2] += g*b
        v[2][0] += b*r
        v[2][1] += b*g
        v[2][2] += b*b
    }
}
``` where width and height define the size of the color component arrays sR[y][x], sG[y][x] and sB[y][x]; and v[y][x] represents the resulting covariance matrix.

The covariance matrix can be calculated for a single picture but can also include data from multiple pictures or some subset of a single picture.

According to an embodiment, the Karhunen-Loeve transform may be applied in a coding unit or block level operation. According to the embodiment, the input color space to the codec may be in RGB, YUV, Karhunen-Loeve, etc. The choice of optimal color space for each block may be decided based on a rate-distortion optimization (RDO). Accordingly, an internal block-level color space transform (e.g., RGB to Karhunen-Loeve or vice versa) may be applied for the samples before final encoding.

According to an embodiment, the choice of optimal color space transform may be decided based on a pre-processing operation to the content before encoding. Alternatively, the decision may be done adaptively in inside the coding chain. Accordingly, the Karhunen-Loeve transform may be applied to the samples of a region (e.g., certain CU, CTU, tile, slice, etc.) inside the image or video.

According to an embodiment, the coefficients of the forward and inverse Karhunen-Loeve transforms may be calculated differently when the transform is applied in block-level than frame level. The coefficients may be optimized considering certain properties of the block, for example, height and width, location of the block inside the frame, etc.

There are some drawbacks associated with the straight-forward calculation of the covariance matrix. For example, while that represents the covariance of different input color components accurately that may not be the optimal selection to decorrelate the color components for video or image codec as such codecs typically operate based on sample prediction.

According to an embodiment, the method comprises calculating, by the video or image encoder or decoder, the color space conversion matrix based on Karhunen-Loeve transform using a covariance matrix calculated using predicted values of red, green and blue samples of a picture, multiple pictures or a subset of a picture.

Thus, the covariance can be calculated advantageously by including a prediction term in the process. This can be implemented following the pseudo code below:

```
for y = 0 to height - 1 {
    for x = 0 to width - 1 {
        r = diff( sR, y, x )
        g = diff( sG, y, x )
        b = diff( sB, y, x )
        v[0][0] += r*r
        v[0][1] += r*g
        v[0][2] += r*b
        v[1][0] += g*r
        v[1][1] += g*g
        v[1][2] += g*b
        v[2][0] += b*r
        v[2][1] += b*g
        v[2][2] += b*b
    }
}
```

According to an embodiment, the method comprises calculating, by the video or image encoder or decoder, the color space conversion matrix based on Karhunen-Loeve transform using a covariance matrix calculated using prediction difference values of red, green and blue samples of a picture, multiple pictures or a subset of a picture.

Now the diff(array, y, x) function can approximate some of the prediction processes applicable in the codec. As an example, it can calculate a prediction value for a certain block of samples in the vicinity of the input sample and return the difference between the sample at array[y][x] and the predicted value. For example, average value for an 8×8 block of samples which the location x, y belongs to can be used as such a predictor. Other approximations can be naturally also used. For example, the block size can be changed to 16×16 or any other block size. The prediction process can use also other color channels, temporal prediction within a sequence of pictures, or other linear or non-linear predictors. In general limiting the diff function to operate only on a restricted range of samples with coordinates close to the input coordinates x, y has the benefit of localizing the processing, reducing the memory bandwidth of the operation and avoiding the need to scan the picture twice (one for predicting the samples and once for calculating the covariance).

According to an embodiment, the method comprises calculating, by the video or image encoder or decoder, the color space conversion matrix based on Karhunen-Loeve transform using a pre-defined covariance matrix or a pre-defined covariance matrix modified based on parameters included in a bitstream.

According to an embodiment, the method comprises performing, by the video or image decoder or the rendering device, a color transform using a first matrix of coefficients, where the matrix of coefficients is constructed so that the scaling the columns of the first matrix with coefficients c0, c1 and c2, and rows with coefficients cR', cG' and cB', transposing the result and scaling the rows of the resulting transposed matrix with inverses of c0, c1 and c2, and scaling the columns with inverses of cR', cG' and cB', represents an inverse of the first matrix.

As human visual system has different response for different wavelengths of light the transform matrices can be further updated to take such characteristics into consideration. For example, before the forward transform the sR, sG and sB may be scaled or pre-quantized with factors cR, cG and cB approximating the importance of each color component to the visual experience. Similarly, after the inverse transform the resulting sample values may be scaled back or dequantized with the cR', cG' and cB' factors as a post-quantization process to recover the full signal amplitude. As the green color component is typically considered the most relevant of the three for the visual perception, it can be selected to have a scaling factor of 1 in order to encode that component at full available fidelity while scaling the sR and sB may be performed with scaling factors cR and cB smaller than 1.

According to an embodiment, the selection of the scaling factors, quantization parameters for the pre-quantizer or dequantization parameters for the post quantizer can be indicated to the decoder in a bitstream or by external means (such as system, file format or transport format level indicators). According to an embodiment, the syntax element(s) of the block-level Karhunen-Loeve transform may be signalled through the bitstream. The signalling may be done in certain conditions such as block size, location, encoding modes of the neighboring blocks, encoding mode of the co-located block in reference frame, etc. Alternatively, the syntax element(s) may be decided in the decoder side for example based on the block size, location, encoding modes of neighboring blocks, encoding mode of the co-located block in reference frame, etc.

The scaling factors can also be embedded in the color transformation matrices by scaling the matrix coefficients associated with each color component by cR, cG and cB in the forward transform matrix and by cR', cG' and cB' in the inverse transform matrix.

In an example embodiment the forward and inverse transform matrices can be rewritten taking the scaling with cR, cG and cB into consideration as:

$$F = \begin{bmatrix} cR \cdot k00/c0 & cG \cdot k01/c0 & cB \cdot k02/c0 \\ cR \cdot k10/c1 & cG \cdot k11/c1 & cB \cdot k12/c1 \\ cR \cdot k20/c2 & cG \cdot k21/c2 & cB \cdot k22/c2 \end{bmatrix}$$

$$G = \begin{bmatrix} cR' \cdot k00 \cdot c0 & cR' \cdot k10 \cdot c1 & cR' \cdot k20 \cdot c2 \\ cG' \cdot k01 \cdot c0 & cG' \cdot k11 \cdot c1 & cG' \cdot k21 \cdot c2 \\ cB' \cdot k02 \cdot c0 & cB' \cdot k12 \cdot c1 & cB' \cdot k22 \cdot c2 \end{bmatrix}$$

In an example embodiment the forward and inverse transform matrices can be rewritten taking the scaling with cR, cG and cB into consideration as:

$$F = \begin{bmatrix} cR \cdot k00 & cG \cdot k01 & cB \cdot k02 \\ cR \cdot k10 & cG \cdot k11 & cB \cdot k12 \\ cR \cdot k20 & cG \cdot k21 & cB \cdot k22 \end{bmatrix}$$

$$G = \begin{bmatrix} cR' \cdot k00 & cR' \cdot k10 & cR' \cdot k20 \\ cG' \cdot k01 & cG' \cdot k11 & cG' \cdot k21 \\ cB' \cdot k02 & cB' \cdot k12 & cB' \cdot k22 \end{bmatrix}$$

The selected scaling parameters may be indicated to the decoder in different ways.

According to an embodiment, the method comprises decoding, by the video or image decoder or the rendering device, an indication of scaling parameters for red, green and blue color components and scaling the red, green and blue color components based on the scaling parameters. Herein, the cR', cG' and cB' factors can be transmitted, for example, either in floating point or fixed point presentation.

According to an embodiment, the method comprises decoding, by the video or image decoder or the rendering device, an indication of scaling parameters for red, green and blue color components and scaling the red, green and blue color components based on the scaling parameters as part of a color space conversion operation. The forward scaling factors cR, cG and cB may be transmitted to the decoder and the decoder will then calculate the inverse scaling factors for example as follows:

$$cR' = 1/cR$$

$$cG' = 1/cG$$

$$cB' = 1/cB$$

Also, a subset of the scaling factor may be indicated to the decoder. For example, only cR' and cB'; or cR and cB; may be indicated and the cG or cG' scaling factor maybe then assigned with a value of 1 by the decoder.

According to an embodiment, the color format of the Karhunen-Loeve transformed data may be 4:4:4, 4:2:0, 4:2:2 or any other format. The transform coefficients may be calculated differently for each color format. Alternatively, the transform coefficients may be calculated for 4:4:4 color format and then adjusted or scaled based on the target color format. For example, lighter scaling may be applied to R, G, and B components when the target color format is not 4:4:4 format.

According to an embodiment, the Karhunen-Loeve transform may be applied in frame or sequence level. Thus, alternatively or in addition to the picture or picture-block level transform described above, the Karhunen-Loeve transform may be applied to a plurality of frames, such as only certain frames inside the video sequence, or to the whole video sequence.

According to an embodiment where the Karhunen-Loeve transform is applied to certain frame(s) of a video sequence, the coding process or hierarchy may be designed in such a way that each Karhunen-Loeve transformed frame is predicted only from the previously coded frames in Karhunen-Loeve color space. Furthermore, in case the prediction of a Karhunen-Loeve transformed frame is performed based on a non-Karhunen-Loeve transformed reference frame, the reference frame may be transformed to Karhunen-Loeve color space before the prediction process. For that, the forward and inverse scaling parameters for the color components for the conversion may be adjusted differently (e.g., lighter scaling) than the normal Karhunen-Loeve transform since the reference frame is an already encoded content which may include samples with lower quality than uncompressed ones.

According to an embodiment, the coefficients of the color space transform are generated using a probability model, a statistical model, such as covariance or cross-correlation model or a Markov process or a Markov chain.

Reducing the distortion in image and video compression is often intended to increase human perceptual quality, as humans are considered to be the end users, i.e. consuming/watching the decoded image. Recently, with the advent of machine learning, especially deep learning, there is a rising number of machines (i.e., autonomous agents) that analyze data independently from humans and that may even take decisions based on the analysis results without human intervention. Examples of such analysis are object detection, scene classification, semantic segmentation, video event detection, anomaly detection, pedestrian tracking, etc. Example use cases and applications are self-driving cars, video surveillance cameras and public safety, smart sensor networks, smart TV and smart advertisement, person re-identification, smart traffic monitoring, drones, etc. The Karhunen-Loeve transform may be used for coding content which is used for non-human visual purposes such as machine-to-machine purposes, thereby applying so-called video coding for machines (VCM).

According to above embodiment, the coefficients and scaling parameters of Karhunen-Loeve transform may be calculated or optimized in such a way that is optimal for a machine analysis task, such as object detection, object segmentation, etc.

The transform parameters may be calculated based on a learning process with neural networks (NNs) by considering the target machine task. In this case, the transform preserves the characteristics of the content that are more important to the target task. For example, if the target task of the machine is sensitive to object edges and boundaries then the Karhunen-Loeve transform coefficients may be trained in a way that preserve those characteristics.

Additionally, the color scaling parameters may be also optimized for the target task of the machine. For example, machine task may be more sensitive to red and blue components of the content, unlike human visual system, which is less sensitive for red and blue, thus the harsher scaling may be applied to green component than red and blue.

The encoded content may be used in more than one machine vision task, for example both object detection and object segmentation. In this case, in addition to training the coefficients and scaling parameters of Karhunen-Loeve transform considering all the machine tasks, the inverse transform coefficients and scaling parameters in the decoder side may be adjusted in such a way that is more suitable for each task.

The methods and the related embodiments can be implemented in different ways. For example, the order of operations described above can be changed or the operations can be interleaved in different ways. Also, different additional operations can be applied in different stages of the processing. For example, there may be additional filtering, scaling, mapping or other processing applied to the final or intermediate result of described operations. The final or intermediate result of the operations described above may also be further combined with results of other operations.

The encoding aspects may be implemented in an apparatus comprising means for determining a first sample in an input color space; means for determining a component of the input color space that the first sample represents; means for determining a pre-quantizer based on the determined component; means for quantizing the first sample using the determined pre-quantizer; and means for encoding the first sample value with video or image coding means.

The above embodiments may likewise be implemented in an apparatus comprising at least one processor and at least one memory, said at least one memory stored with computer program code thereon, the at least one memory and the computer program code configured to, with the at least one processor, cause the apparatus at least to perform: determine a first sample in an input color space; determine a component of the input color space that the first sample represents; determine a pre-quantizer based on the determined component; quantize the first sample using the determined pre-quantizer; and encode the first sample value with video or image coding means.

The decoding aspects may be implemented in an apparatus comprising: means for decoding at least a first sample value with video or image decoding means; means for performing a color space transform operation including mapping of the first sample value in a first color space to a second sample value in a second color space; means for selecting a post-quantizer for the second sample value based on which output color space component the second sample represents; and means for dequantizing the second sample value with the selected post-quantizer.

The decoding aspects may likewise be implemented in an apparatus comprising at least one processor and at least one memory, said at least one memory stored with computer program code thereon, the at least one memory and the computer program code configured to, with the at least one processor, cause the apparatus at least to perform: decode at least a first sample value with video or image decoding means; perform a color space transform operation including mapping of the first sample value in a first color space to a second sample value in a second color space; select a post-quantizer for the second sample value based on which output color space component the second sample represents; and dequantize the second sample value with the selected post-quantizer.

Herein, the decoder should be interpreted to cover any operational unit capable to carry out the decoding operations, such as a player, a receiver, a gateway, a demultiplexer and/or a decoder.

Such apparatuses may comprise e.g. the functional units disclosed in any of the FIGS. 1, 2, 4a, 4b, and 7 for implementing the embodiments.

Figure 8:
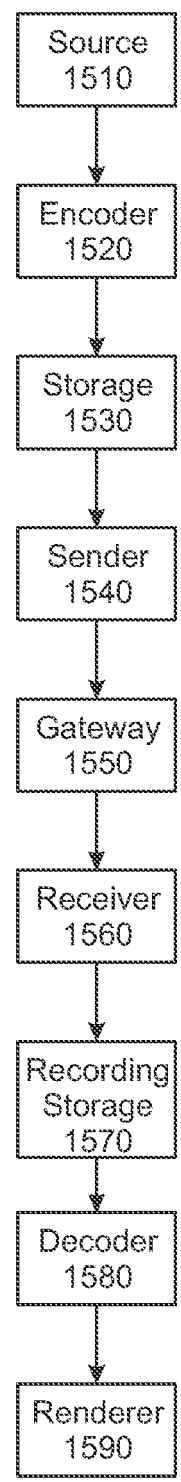
FIG. 8 shows a schematic diagram of an example multimedia communication system within which various embodiments may be implemented.

FIG. 8 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. The gateway 1550 may be a server entity in various embodiments.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different representations e.g. for switching between different viewports of 360-degree video content, view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. In other words, the receiver 1560 may initiate switching between representations. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for switching between different viewports of 360-degree video content, view switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Faster decoding operation might be needed for example if the device including the decoder 1580 is multitasking and uses computing resources for other purposes than decoding the video bitstream. In another example, faster decoding operation might be needed when content is played back at a faster pace than the normal playback speed, e.g. twice or three times faster than conventional real-time playback rate.

In the above, some embodiments have been described with reference to and/or using terminology of HEVC. It needs to be understood that embodiments may be similarly realized with any video encoder and/or video decoder.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder. For example, some embodiments have been described related to generating a prediction block as part of encoding. Embodiments can be similarly realized by generating a prediction block as part of decoding, with a difference that coding parameters, such as the horizontal offset and the vertical offset, are decoded from the bitstream than determined by the encoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An apparatus comprising:
 at least one processor; and
 at least one memory storing instructions that, when executed by the at least one processor, cause the apparatus at least to:
 determine a first sample in an input color space;
 determine a component of the input color space that the first sample represents;
 determine a pre-quantizer based on the determined component;
 determine a quantization parameter for the pre-quantizer or a post-quantizer;
 indicate the quantization parameter in a bitstream;
 quantize the first sample using the determined pre-quantizer before color space conversion; and
 encode the first sample value with video or image coding means.

2. The apparatus according to claim 1, wherein the apparatus is further caused to:
 perform a color space transform with a matrix multiplication, wherein a forward transform matrix comprises matrix coefficients defining a transform that confines all the color channels within a dynamic range of the input.

3. The apparatus according to claim 1, wherein the apparatus is further cased to:
 calculate coefficients for forward and inverse color transforms based on content characteristics of at least the first sample; and
 indicate at least one of the forward and the inverse coefficients to the decoder.

4. The apparatus according claim 1, wherein the apparatus is further cased to:
 calculate a color space conversion matrix based on Karhunen-Loeve transform using a covariance matrix calculated using red, green and blue sample values of a picture, multiple pictures or a subset of a picture.

5. The apparatus according to claim 4, wherein said covariance matrix is calculated using predicted values of red, green and blue samples.

6. The apparatus according to claim 4, wherein said covariance matrix is calculated using prediction difference values of red, green and blue samples.

7. A method comprising:
 determining a first sample in an input color space;
 determining a component of the input color space that the first sample represents;
 determining a pre-quantizer based on the determined component;
 determining a quantization parameter for the pre-quantizer or a post-quantizer;
 indicating the quantization parameter in a bitstream;
 quantizing the first sample using the determined pre-quantizer before color space conversion; and
 encoding the first sample value with video or image coding means.

8. An apparatus comprising:
 at least one processor; and
 at least one memory storing instructions that, when executed by the at least one processor, cause the apparatus at least to:
 decode at least a first sample value with video or image decoding means;
 perform a color space transform operation comprising a mapping of the first sample value in a first color space to a second sample value in a second color space;
 select a post-quantizer for the second sample value based on which output color space component the second sample represents;
 decode a quantization parameter from a bitstream;
 determine a dequantization parameter for the post-quantizer based on the decoded quantization parameter; and
 dequantize the second sample value with the selected post-quantizer after inverse color space conversion.

9. The apparatus according to claim 8, wherein the apparatus is further caused to:
 perform an inverse color space transform with a matrix multiplication, wherein an inverse of an inverse transform matrix comprises matrix coefficients defining a transform that confines all the color channels within a dynamic range of the input.

10. The apparatus according to claim 8, wherein the apparatus is further caused to:
 decode an indication of scaling parameters for red, green and blue color components; and scale the red, green and blue color components based on the scaling parameters.

11. The apparatus according to claim 8, wherein the apparatus is further caused to:
 perform a color transform using a first matrix of coefficients, wherein the first matrix of coefficients is constructed such that scaling the columns of the first matrix with first coefficients, transposing the scaled matrix and scaling the rows of the resulting transposed matrix with inverses of the first coefficients represents an inverse of the first matrix.

12. The apparatus according to claim 8, wherein the apparatus upon the execution by the processor of the instructions is further caused to:
 perform a color transform using a first matrix of coefficients, wherein the matrix of coefficients is constructed such that scaling the columns of the first matrix with first coefficients, and rows with second coefficients, transposing the scaled matrix and scaling the rows of the resulting transposed matrix with inverses of the first coefficients, and scaling the columns with inverses of the second coefficients represents an inverse of the first matrix.

13. The apparatus according to claim 8, wherein the apparatus is further caused to:
calculate a color space conversion matrix based on a Karhunen-Loeve transform using a covariance matrix calculated using red, green and blue sample values of a picture, multiple pictures or a subset of the picture.

14. The apparatus according to claim 13, wherein said covariance matrix is calculated using prediction difference values of red, green and blue samples.

15. A method comprising:
decoding at least a first sample value with video or image decoding means;
performing a color space transform operation comprising mapping of the first sample value in a first color space to a second sample value in a second color space;
selecting a post-quantizer for the second sample value based on which output color space component the second sample represents;
decoding a quantization parameter from a bitstream;
determining a dequantization parameter for the post-quantizer based on the decoded quantization parameter; and
dequantizing the second sample value with the selected post-quantizer after inverse color space conversion.

16. The method according to claim 15, further comprising:
performing an inverse color space transform with a matrix multiplication, wherein an inverse of an inverse transform matrix comprises matrix coefficients defining a transform that confines all the color channels within a dynamic range of the input.

17. The method according to claim 15, further comprising:
decoding an indication of scaling parameters for red, green and blue color components; and
scaling the red, green and blue color components based on the scaling parameters.

18. The method according to claim 15, further comprising:
performing a color transform using a first matrix of coefficients, wherein the first matrix of coefficients is constructed such that scaling the columns of the first matrix with first coefficients, transposing the scaled matrix and scaling the rows of the resulting transposed matrix with inverses of the first coefficients represents an inverse of the first matrix.

19. The method according to claim 15, further comprising:
performing a color transform using a first matrix of coefficients, wherein the matrix of coefficients is constructed such that scaling the columns of the first matrix with first coefficients, and rows with second coefficients, transposing the scaled matrix and scaling the rows of the resulting transposed matrix with inverses of the first coefficients, and scaling the columns with inverses of the second coefficients represents an inverse of the first matrix.

20. The method according to claim 15, further comprising:
calculating a color space conversion matrix based on a Karhunen-Loeve transform using a covariance matrix calculated using red, green and blue sample values of a picture, multiple pictures or a subset of the picture.

* * * * *